United States Patent [19]

Imataki et al.

[11] 4,203,143

[45] May 13, 1980

[54] PROTECTIVE DEVICE

[75] Inventors: Mitsumasa Imataki; Katsu Ujita; Tsutomu Egashira, all of Amagasaki, Japan

[73] Assignee: Mitsubishi Denki Kabushiki Kaisha, Tokyo, Japan

[21] Appl. No.: 902,449

[22] Filed: May 3, 1978

[30] Foreign Application Priority Data

May 7, 1977 [JP] Japan .............................. 52-52191

[51] Int. Cl.[2] .............................. H02H 3/22

[52] U.S. Cl. .............................. 361/120; 361/127

[58] Field of Search .............. 361/120, 117, 126, 127, 361/128, 129, 130; 315/35, 36; 313/325

[56] References Cited

U.S. PATENT DOCUMENTS

| | | | |
|---|---|---|---|
| 2,608,600 | 8/1952 | Vorts et al. | 361/130 X |
| 3,259,781 | 7/1966 | Person | 361/126 X |
| 3,649,875 | 3/1972 | Nagai et al. | 361/130 |
| 3,842,318 | 10/1974 | Nitta | 361/120 |
| 3,988,645 | 10/1976 | Luxa et al. | 361/120 |
| 4,035,693 | 7/1977 | Luxa et al. | 361/120 |

*Primary Examiner*—Patrick R. Salce

*Attorney, Agent, or Firm*—Oblon, Fisher, Spivak, McClelland & Maier

[57] ABSTRACT

A protective device for protecting from abnormal voltage such as a lightning arrester comprises an earthing cylindrical metallic casing; an electrode or conductive substrate which is disposed to the direction of the axis of the metallic casing; an insulating pipe which is in spread-out shape and is disposed between the metallic casing and the electrode or the conductive substrate; and a plurality of non-linear resistors which are disposed in said insulating pipe wherein said non-linear resistors are respectively connected so as to be substantially similar to the potential distribution in said metallic casing.

5 Claims, 10 Drawing Figures

PROTECTIVE DEVICE

BACKGROUND OF THE INVENTION

1. Field of the Invention

The present invention relates to a lightning arrester for instantaneously protecting an electric circuit from abnormal voltage.

2. Description of the Prior Arts

Heretofore, it has been known to use the device shown in FIG. 1 as the protective device.

In FIG. 1, the reference numeral (1) designates an earthing tank which has an inner part (2) as a space filled with a gas having high insulating strength such as $SF_6$; (3) designates a resistor having excellent non-linear characteristic, for example a resistor formed by superposing sintered substrates having main component of zinc oxide; (4) designates a conductive substrate as a lead wire in high voltage side; (5) designates an insulating spacer for holding the lead wire (4).

The operation of the conventional protective device will be illustrated.

The lead wire (4) is connected to the terminal for high voltage of the apparatus which should be protected, and the surge given by thunderbolt etc. is shorted through the resistors (3).

FIG. 2 shows one example of voltage-current characteristic of the zinc oxide sintered element used as the resistor (3). The raising of the terminal voltage to the surge voltage is lowered by the constant voltage characteristic in a wide range.

The full line in FIG. 2 shows the characteristic to DC or large current surge.

The voltage-current characteristics in the case of applying AC voltage to said element as the peak values of the current and voltage, are different from those of the DC voltage in the small current region as shown by the broken line of FIG. 2, since the element has electrostatic capacity. These characteristics are common to the zinc oxide sintered element and the other non-linear resistors.

The voltage-current characteristics for relatively high AC voltage are similar to those of the DC voltage.

In FIG. 2, the characteristic curves for AC and DC voltages are substantially similar when the voltage is higher than Vo. However, they are different when the voltage is lower than Vo.

The current at Vo is usually higher than 1 mA in the case of zinc oxide sintered element.

Thus, AC line voltage is normally applied to the non-linear resistor in the AC lightning arrester.

The normal earthing voltage should be the level being lower than Vo such as Vp shown in FIG. 2 from the viewpoint of the life of the element as described below.

The following troubles are caused because these elements function as a simple capacitor at low AC voltage.

In the structure of FIG. 1, the floating capacity is formed between the non-linear element (3) and the tank (1) whereby the voltage allotment of the non-linear resistor by the equivalent circuit as shown in FIG. 3 to the low AC voltage such as the normal earthing voltage should be considered.

In FIG. 3, the reference H designates a total length of the non-linear resistor; X designates a distance from the high voltage terminal to the point considered; $d_X$ designates a differential distance for the following calculation; $K/d_X$ designates an electrostatic capacity of the element at the part of $d_X$; $Cd_X$ designates an electrostatic capacity between the part of $d_X$ and the tank; and $V_X$ designates an electric potential of the non-linear resistor at the point X to the voltage V.

The following equation is given $$V(X)Cd_X = \frac{d}{d_X}\left[\frac{dv(X)}{d_X}\cdot d_X\cdot\frac{K}{d_X}\right]d_X$$

When the references C and K are constant regardless of X, the equation can be as follows.

$$\frac{dV(X)}{dX^2} = \frac{C}{K}V(X)$$

The equation is considered in the boundary condition $V_{(o)}=V$ $$V(X) = V\frac{\sinh\left[\sqrt{\frac{c}{k}}\,(H-X)\right]}{\sinh\left[\sqrt{\frac{c}{k}}\,H\right]}$$

The potential distribution V(X) of the non-linear resistor is given in the form shown by the full line in FIG. 4(*a*), which is different from the linear potential distribution shown by the broken line.

As it is clear from the above-mentioned equations, the deviation from the linear potential distribution is increased depending upon the increase of the length of the non-linear resistor.

As the result, the field $E(X)=|dV(X)/dX|$ in the inner part of the non-linear resistor is significantly non-uniform as shown by the full line in FIG. 4(*b*).

The maximum field is formed in the high voltage side (X=0), and the field Emax at the maximum field point is significantly higher than the average field Eav.

In this circumstance, it is found the overvoltage to the level of the normal earthing voltage Vp shown in FIG. 2 at the part near the high voltage side of the non-linear resistor.

When the overvoltage is normally applied to the element, the element is electrically deteriorated.

FIG. 5 shows one example of the curve of voltage-life of the zinc oxide element.

The life is significantly shorter depending upon approaching the voltage to Vo.

Accordingly, in the conventional structure, the normal earthing voltage is deviated to the high voltage side and the non-linear resistor at the part, significantly deteriorated, disadvantageously.

SUMMARY OF THE INVENTION

It is an object of the present invention to provide a protective device for protecting equipment from an abnormal surge voltage which permits the voltages of the non-linear resistors to be uniformly allotted by an improvement in the arrangement of the non-linear resistors and which is not deteriorated so that it can maintain high functional characteristics.

The foregoing and other objects of the present invention have be attained by providing a protective device which comprises an earthing cylindrical metallic casing; an electrode or conductive substrate which is disposed to the direction of the axis of the metallic casing; an insulating pipe which is in spread-out shape and is disposed between the metallic chasing and the electrode or the conductive substrate; and a plurality of non-linear resistors which are disposed in said insulating pipe wherein said non-linear resistors are respectively connected so as to be substantially similar to the potential distribution in said metallic casing.

DETAILED DESCRIPTION OF THE PREFERRED EMBODIMENTS

Figure 6:
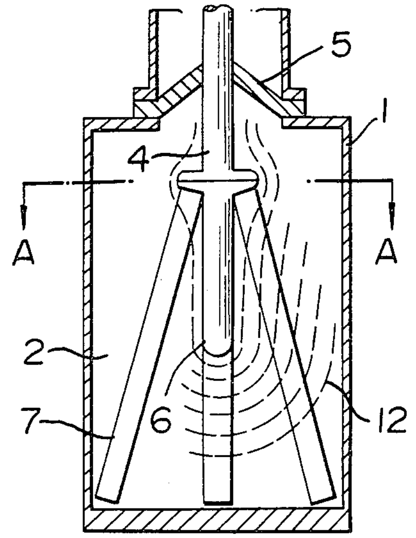
FIG. 6 is a sectional view of one embodiment of the protective device of the present invention.

FIG. 6 shows one embodiment of the present invention.

In FIG. 6, the reference numeral (1) designates an earthing tank which has the inner part (2) as the space filled with a gas having high insulating strength such as $SF_6$; (4) designates a conductive substrate which performs as the lead wire in the high voltage side; (5) designates an insulating spacer for holding the lead wire (4); (6) designates an electrode arranged in the axial direction of the earthing tank (1) and (7) designates a plurality of pipes made of an insulating material.

Figure 7:
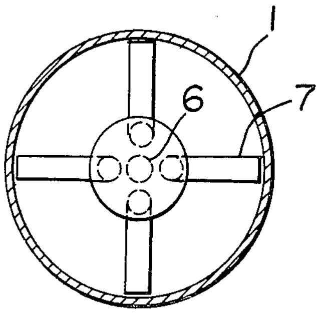
FIG. 7 is a plan view from the direction of the A—A line of FIG. 6.

FIG. 7 is a plan view from the direction of the A—A line of FIG. 6.

The insulating pipes (7) are radially arranged from the point of the electrode (6) as shown in FIG. 7, and the other ends of the insulating pipes are fixed on the earthing tank (1) with fittings (not shown).

Figure 8:
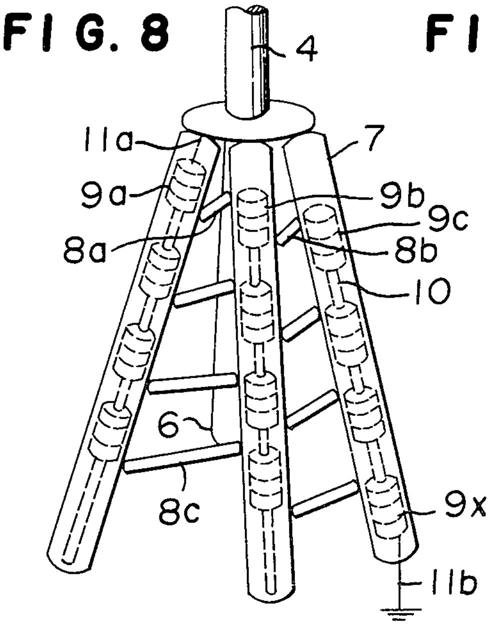
FIG. 8 is a schematic view of the protective device of FIG. 6.

FIG. 8 is a schematic view of the protective device showing the arrangements in the inner parts of FIG. 6.

In the inner part of each insulating pipe (7), a plurality of the non-linear resistors (3 pieces in FIG. 8) connected in series are arranged in plural steps through the insulating spacer (10).

The grouped non-linear resistors **(9*a*) which are closest to the electrode are connected through the lead wire (11*a*) to the electrode (4) and are further connected through the lead wires (8*a*) to the grouped non-linear resistor (9*b*) and are further connected through the lead wire (8*b*) to the next grouped non-linear resistors (9*c*)**.

In the same manner, a plurality of the grouped non-linear resistors are connected in series to the grouped non-linear resistors **(9*x*) and are earthed through the lead wire (11*b*)** to the ground.

Figure 9:
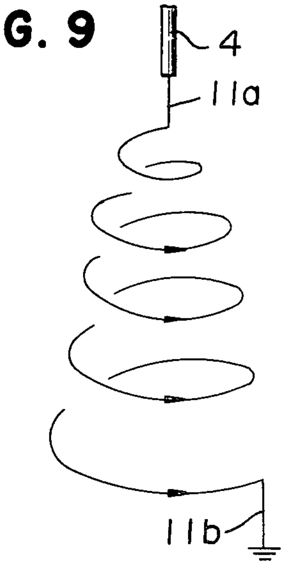
FIG. 9 shows the condition of connecting the non-linear resistors.

FIG. 9 shows the condition of the serial connections of the non-linear resistors in a spiral form.

In FIG. 6, the electric potential distribution between the electrode (6) and the earthed tank (1) is shown by the broken line (12).

In the present invention, a plurality of the ground non-linear resistors **(9*a*), (9*b*), (9*c*), . . . (9*x*) of FIG. 8 are arranged to give substantially similar potential to the electric potential distribution in FIG. 6**. Accordingly, the potentials of the non-linear resistors are uniformly allotted without disturbing the electric potential distribution whereby the life of the non-linear resistors can be prolonged.

Moreover, the structure of the protective device is simple to provide the economical protective device for protecting from abnormal voltage.

Figure 1:
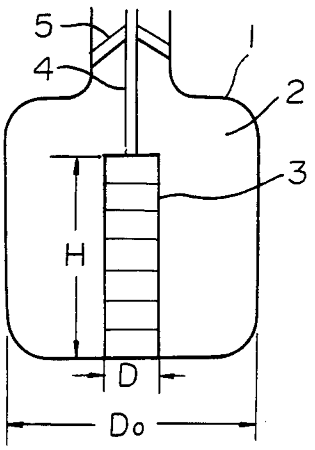
FIG. 1 PRIOR ART
FIG. 1 is a sectional view of the conventional protective device for protecting from abnormal voltage.
Figure 2:
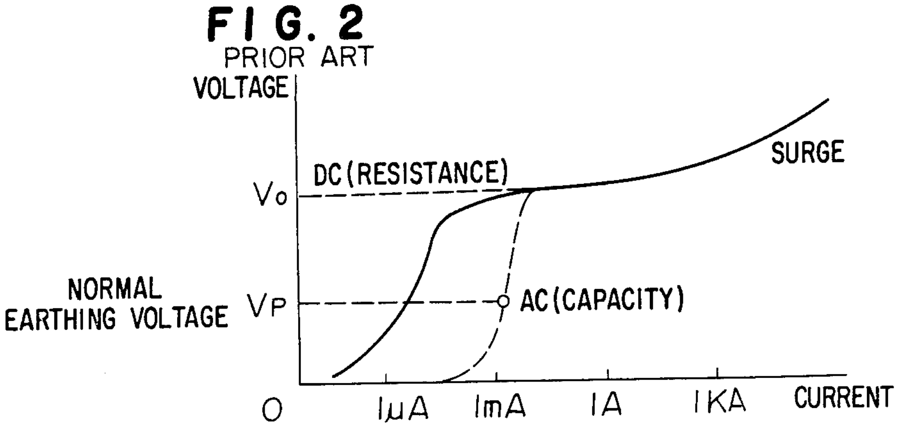
FIG. 2 PRIOR ART
FIG. 2 is a characteristic diagrams of the protective device.
Figure 3:
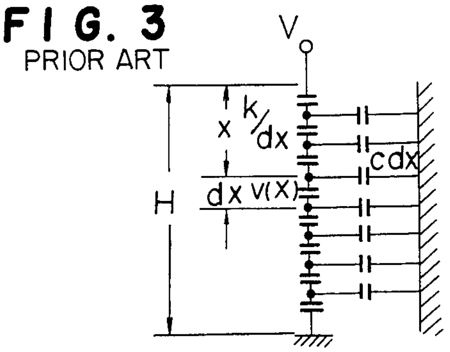
FIG. 3 PRIOR ART
FIG. 3 is an equivalent circuit to the structure of FIG. 1.
Figure 4:
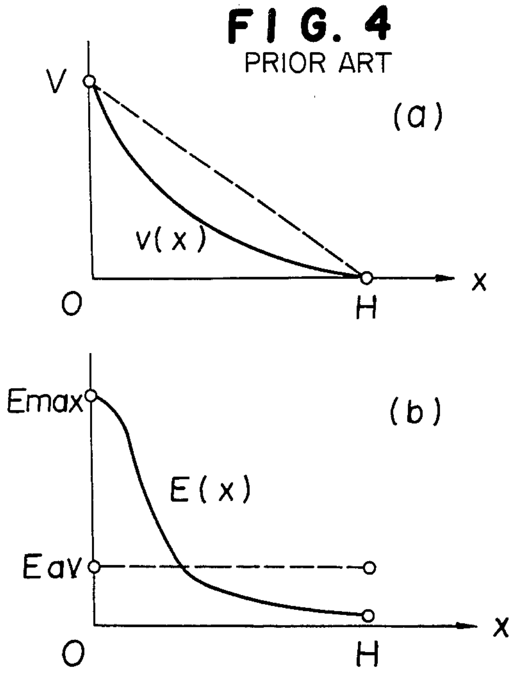
FIG. 4 PRIOR ART
FIG. 4 shows electric potential distribution of the protective device of FIG. 1.
Figure 10:
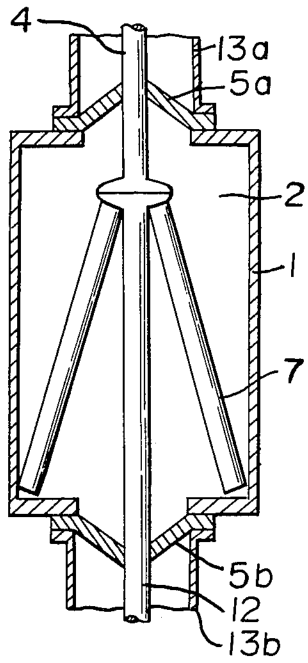
FIG. 10 is a sectional view of the other embodiment of the protective device of the present invention.
Figure 5:
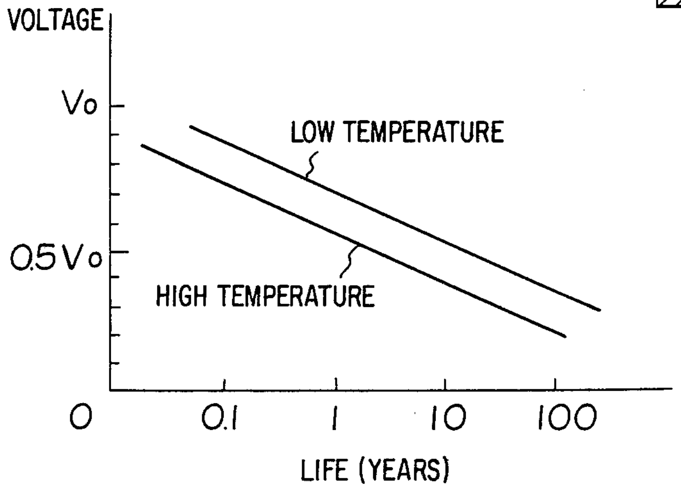
FIG. 5 PRIOR ART
FIG. 5 shows the characteristic of life of a non-linear resistor.

FIG. 10 shows the other embodiment of the present invention.

In FIG. 10, the conductor (12) is used instead of the electrode (6) shown in FIG. 6, and tanks for gas insulating bus bar **(13*a*), (13*b*)** are used.

In accordance with the present invention, the protective device for preventing from abnormal voltage can be inserted at the part of the bus bar whereby the compact protective device can be attained.

What is claimed is:

1. A protective device for protecting from abnormal voltage which comprises an earthing cylindrical metallic casing; an electrode or conductive substrate which is disposed in the direction of the axis of the metallic casing; an insulating pipe which is disposed between the metallic casing and the electrode or the conductive substrate; and a plurality of non-linear resistors which are disposed in said insulating pipe wherein said non-linear resistors are respectively connected so as to be substantially similar to the potential distribution in said metallic casing.

2. A protective device according to claim 1 wherein a plurality of grouped non-linear resistors are connected in series.

3. A protective device according to claim 1 wherein a plurality of the insulating pipes are connected in spread-out form.

4. A protective device according to claim 1 wherein a tank for gas insulating bus bar is connected to the protective device.

5. A protective device according to claim 1 wherein a plurality of insulating pipes are arranged around a conductive substrate.

* * * * *